Dec. 2, 1969 A. REGNIER ET AL 3,482,226

TELEPHONE LINE SUPERVISION USING A TRANSFLUXOR

Filed Aug. 30, 1966 2 Sheets-Sheet 1

TELEPHONE LINE SUPERVISION USING A TRANSFLUXOR

Filed Aug. 30, 1966 2 Sheets-Sheet 2

United States Patent Office 3,482,226

Patented Dec. 2, 1969

3,482,226

TELEPHONE LINE SUPERVISION USING A TRANSFLUXOR

Albert Regnier, Issy-lez-Moulineaux, Kevork Kevorkian, St.-Germain-en-Laye, and Raymond Bakka, Asnieres, France, assignors to International Standard Electric Corporation, New York, N.Y., a corporation of Delaware Filed Aug. 30, 1966, Ser. No. 576,067
Claims priority, application France, Sept. 17, 1965, 31,748
Int. Cl. G11b *5/00;* H04m *3/00*
U.S. Cl. 340—174 7 Claims

ABSTRACT OF THE DISCLOSURE

Circuits are provided for telephone line supervision. Transfluxors are connected to each telephone line and are used with logic circuits to produce output signals in response to coincidence between selected scanning pulses and a busy or other selected state in the telephone line. The output signals are made available for use in determining tolls, busy status and the like. The input windings of the transfluxors are coupled to the respective lines by impedance and current adaptor means which compensate for differences in the telephone lines. This permits uniformity in the manufacture of the transfluxors.

Figure 1:
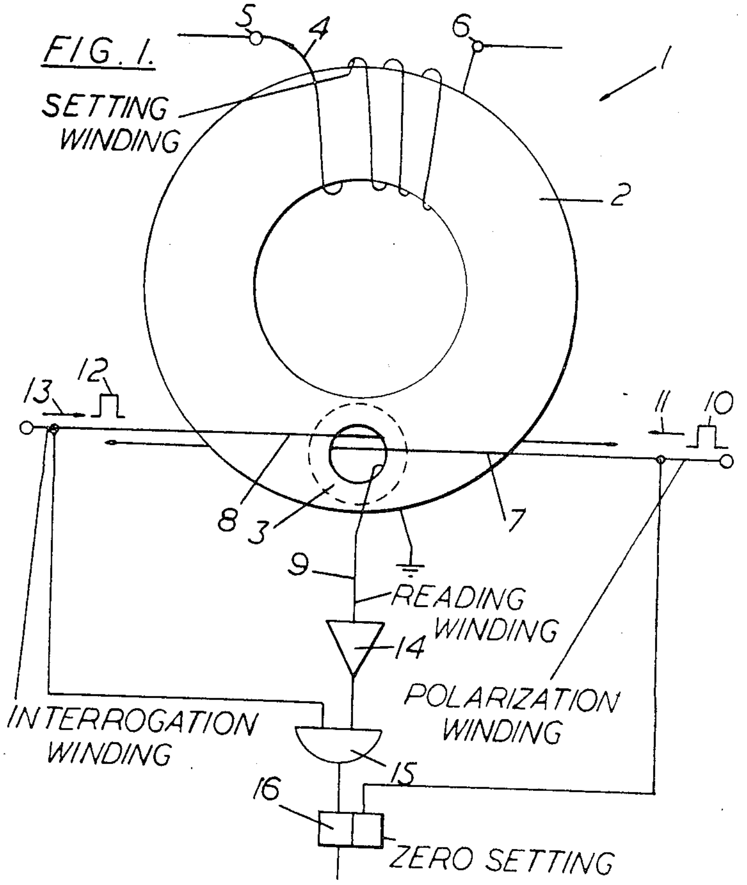

This invention relates to devices making it possible to effect continuous measurement and permanent control of the state of telephone lines with a view, amongst other purposes, to supervising the beginning and the ending of calls so as to affect recorders which ensure the determination of fees and for freeing of these calls.

In automatic telephony with an electronic central exchange, supervision is conducted through periodic comparison of the state of service with the previous state and it is necessary to indicate, to the central set, the state of lines connected to the communication system (subscriber lines or lines between exchanges) so as to enable it to effect the various operations relative to calls.

The following states can be expressed, for example:

Removal of the receiver by a calling subscriber with contact with the calling circuit.

Removal of the receiver by a called subscriber with hanging up by the calling subscriber during ringing.

Hanging up by two subscribers at the end of a call.

These states are frequently quite distinct, the one from the other, and to detect each of them, it is necessary to use as many detectors as there are states with each of the detectors being appropriate to the corresponding state.

This detection is generally effected by means of a magnetic core on which different coils are wound. In particular, a setting winding is required through which the current flowing in the line under consideration passes and which conditions the state of magnetic saturation of the core from which the state of the line is deduced, an interrogation winding through which pulses of a predetermined amplitude periodically pass, and a reading winding connected to a recording or supervising circuit.

This layout has the disadvantage of engendering interference between the fluxes switched by the setting winding and the interrogation winding which interference can be the source of errors of interpretation.

Furthermore, in order to obtain a very short time of changeover of the core, it is necessary that the setting winding should have a large number of turns which, therefore, is difficult to obtain in practice.

In addition, the response signal delivered by the reading winding has an amplitude which, in practice, is a linear function of the current passing through the setting winding. Thus, a variation of up to double the setting current only engenders a variation in the reading voltage to the same extent which, therefore, renders discrimination difficult. In practice, this is quite insufficient since secondary effects due to the variation in temperature, to that of the supply voltage and in the tolerances of components, further reduce the variation in the reading voltage to a great extent.

Furthermore, to obtain standardized production, it is best to use identical cores carrying the same number of turns on the setting winding despite the fact that the current passing through this winding is different according to the nature of the state of the line to be detected. Thus, in order to adapt the current passing through the line to that which must pass through the winding, it is necessary to connect an appropriate impedance to the terminals of the said winding. This arrangement has the disadvantage of modifying the value of the reading voltage delivered by the core under consideration which is then a function of the impedance on the side of the winding terminals which can result in interpretation errors.

The present invention has for a primary object a new device to scan and supervise telephone lines, making it possible to avoid the disadvantages which have just been described, and, offering, besides, the advantage of being economical.

A preferred embodiment of the invention consists, essentially, of transfluxors of a type carrying a main magnetic core and, at least, one secondary magnetic core with the number of transfluxors being at least equal to the number of categories of information to be detected per line or circuit. Each transfluxor is equipped with a first winding or setting winding, wound on the main core and connected between the line or circuit conductors under consideration; a second winding or polarization winding, wound on the secondary core and connected to a first cyclic pulse generator; a third winding or interrogation winding, wound on the secondary core in the opposite direction to that of the second winding and connected to a second cyclic pulse generator; and, finally, a fourth winding or reading winding, wound on the secondary core and connected to a recording or supervision circuit.

According to a characteristic particular to the invention, the setting windings of the transfluxors corresponding to each line or circuit are identical and are connected to the said line by means, respectively, of impedance and different current circuit adaptors each corresponding to the nature and amplitude of the information to be detected.

Further, subordinate characteristics of the invention will be evident from the following detailed description given with reference to the attached drawings. It is well understood that the description and the drawings are only given for information purposes and in no way limit the invention.

Figure 2:
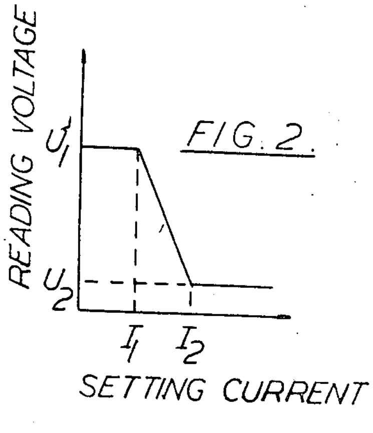
Figure 4:
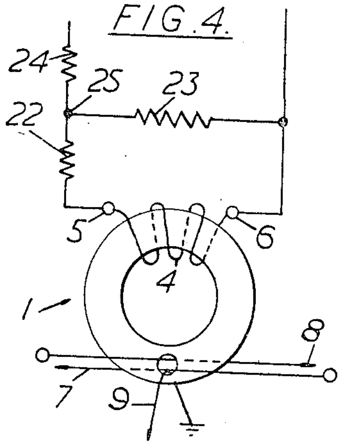
Figure 3:
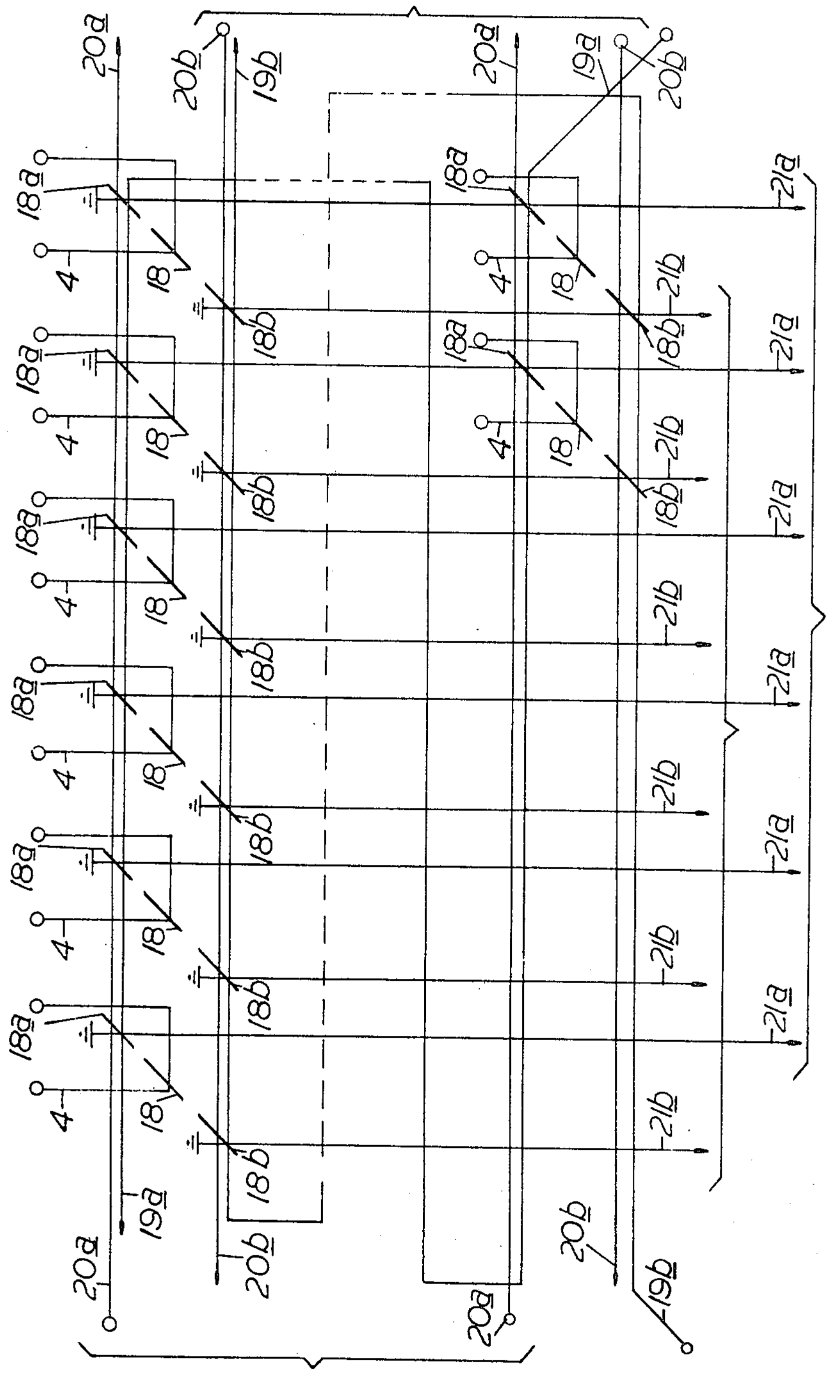

FIG. 1 shows the wiring diagram of an example of application in the invention,

FIG. 2 gives a schematic diagram of the working principle of the device shown on FIG. 1, FIG. 3 gives the wiring diagram of another example of an application of the invention and, FIG. 4 shows the wiring diagram of a practical example of an impedance adaptor.

As shown on FIG. 1, the device includes a transfluxor 1 formed by the combination of a main magnetic core 2 and a secondary magnetic core 3. A winding 4, or setting winding, is wound on the main magnetic core 2 with its terminals 5 and 6 connected, for example, to the terminals of a subscriber line not shown on the drawing.

The second winding, carrying reference 7 and consisting, for example, of a single conductor, is wound on the secondary core 3. This winding is termed the "polarization winding" and is connected to a first cyclic generator of short pulses not shown on the figure. This winding 7 is connected to the generator in such a manner as to be traversed by square pulses 10 in the direction of arrow 11.

A third winding 8 or "interrogation winding" is found on the secondary magnetic core in the opposite direction to that of polarization winding 7 and is connected to another cyclic pulse geerator not shown on the figure. This winding is connected to the generator in such a manner as to allow passage of square pulses 12 in the direction of arrow 13.

The transfluxor carries a last winding or "reading winding" carrying reference 9 and wound on secondary core 3. This winding 9 is connected to an amplifier 14 of minimum amplitude threshold, this amplifier carrying a rectifier component in such a manner as only to allow passage of well determined polarity pulses corresponding to a single swinging direction of the secondary core 3.

The input of interrogation winding 8 and the output of amplifier 14 are respectively connected to the two inputs of and "AND" gate 15 the output of which is connected to an input on a flip-flop 16, the other input of this flip-flop being connected to the input of polarization winding 7 for zero resetting purposes.

When the telephone line to which terminals 5 and 6 of setting windings 4 are connected, is open, the current passing through this winding is practically zero or at least, generally, less than a value $I_1$ which can be of the order of 7 milliamperes. For this current value, the main core 2 is not saturated and a polarization pulse followed by an interrogation pulse results in a change in the magnetic state of secondary core 3. This results in voltage arriving at the output terminals of the reading winding which can have a value $U_1$ as shown on FIG. 2.

When the current passing through the line has a variation of more than value $I_1$, the main magnetic core tends to become saturated and then to saturate also the secondary magnetic core in such a manner as to prevent the latter from swinging. This saturation is attained when the current passing through the setting winding attains a value $I_2$ which can, for example, be of the order of 14 milliamperes. The curve shown on FIG. 2 shows, in a diagrammatic manner, the variation in the value of reading voltage as a function of the current passing through the setting winding. This curve shows, in particular, that, when the setting current passes from value $I_1$ to value $I_2$, the reading voltage decreases from value $U_1$ to value $U_2$, this decrease being practically linear.

When the value of the current passing through the setting winding 4 has a value greater than $I_2$, the main core is completely saturated and a polarization pulse followed by an interrogation pulse does not result in a swing in the magnetic state of the secondary core.

It can, furthermore, be noted that a variation of up to double the value of the setting current results in a variation which is two or three times stronger in the reading voltage.

In the case where the subscriber line under consideration is open, each swing in the secondary magnetic core engenders a reading voltage which delivers a signal transmitted to gate 15 by means of amplifier 14. The interrogation pulse and the reading voltage are engendered almost simultaneously in such a manner that the "AND" gate expressing this simultaneity delivers a signal recorded by flip-flop 16 which can consist, for example, of the input of a recording or supervision circuit of binary type.

Each state to be detected on a line corresponds to a detector such as that shown on FIG. 1. Thus, in the device shown on FIG. 3, to each line are associated 6 transfluxors 18 capable of detecting 6 distinct states in the line, these 6 detectors being arranged on the same row with the device carrying as many rows as there are lines to supervise.

Each of these transfluxors carries two secondary magnetic cores shown diagrammatically on FIG. 3 and carrying references **18*a* and 18*b*. These secondary magnetic cores are identical and each carry, as in the case of core 3 defined hereafter, a polarization winding 19, an interrogation winding 20 and a reading winding 21** each of these windings carrying reference *a* or reference *b* according to whether it is wound on secondary core **18*a* or secondary core 18*b***.

Thus, two distinct sets of windings wound, respectively, on cores **18*a* and 18*b*** are available. According to one method of use, one of these assemblies can be in service while the other is at rest, or again, according to another method of use, the two assemblies can be in service at one and the same time. This arrangement increases the reliability factor of the device and offers, furthermore, the advantage of being of small dimensions since duplication of information detection and transmission circuits is effected by means of two assemblies mounted on the same transfluxor whereas, in known devices of this type, made from magnetic core, it is necessary to double the number of cores which results, furthermore, in wiring difficulties.

All the detectors of the matrix shown on FIG. 3 are identical. In order to adapt each detector to the nature of the state and the value of the information to be detected, an impedance and current adaptor is connected between the input terminals of the corresponding setting winding. An example of this impedance and current adaptor is given on FIG. 4 and consists of a resistance 22 connected to terminal 5 and mounted in series with a resistance 23 connected to terminal 6 with a third resistance 24 connecting terminal 25, which is common to the three resistances, to one of the line terminals, which is not shown on the drawing, the other line terminal being connected to terminal 6. This arrangement makes it possible to pass a current to setting winding 4 the amplitude of which conditions the state of magnetic saturation of the main core and, then, conditions the value of the reading voltage likely to appear at the output of winding 9, this value being independent of the value of the impedance seen from the winding terminals and consisting, essentially, of the three resistances. This forms a particularly interesting application of transfluxors to the supervision of telephone lines and, more generally, telecommunication circuits.

The invention is not limited to the sole methods of application described and shown. On the contrary, it covers all alternatives concerning, in particular, the number of secondary cores and windings of each transfluxor, the number of transfluxors associated to each line to be supervised and the nature of the impedance and current adaptor connected between the setting winding of each transfluxor and the line under consideration.

What is claimed is:

1. Circuits for supervising telephone lines comprising means for providing signals designating the state of a telephone line,
   - said means including a plurality of transfluxors, each of said transfluxors incorporating a main magnetic core and a secondary magnetic core linked magnetically to the main core,
   - a first winding wound on said main core and having end terminals connected to a telephone line under supervision,
   - a second winding wound on the secondary core in a first direction to receive first cyclic pulses,
   - a third winding wound on the secondary core in the direction opposite to that of the second winding to receive second cyclic pulses,
   - a fourth winding wound on the secondary core and connected to a sensing circuit to provide signals in accordance with changes in the secondary magnetic core, and gating means coupled to respond to said signals on the fourth winding and to said second and to said third cyclic pulses to provide output signals designating the state of said telephone line.

2. A transfluxor substantially as claimed in claim 1, in which the first winding is a "setting" winding for connection between the conductors of a circuit under supervision, the second winding is a "polarization" winding for receiving said first cyclic pulses, the third winding is an interrogation winding for receiving said second cyclic pulses, and the fourth winding is a "reading winding" for detecting changes in the secondary magnetic core.

3. A plurality of transfluxors as claimed in claim 1 associated with a plurality of external lines, and including a plurality of different impedance and current adaptor circuits for coupling said transfluxors to said lines, said impedance and current adaptor circuits having different values according to the nature and amplitude of information to be detected.

4. A plurality of transfluxors substantially as claimed in claim 3, in which each impedance and current adaptor circuit includes a first resistance mounted in series with the setting winding under consideration, a second resistance mounted across terminals of the setting winding including a terminal common to the first resistance, and a third resistance connected between the terminal common to the first and second resistances and the line under consideration.

5. A transfluxor substantially as claimed in claim 1, in which the transfluxor carries a secondary core identical to the first, and the second secondary core has wound thereon three windings which are respectively identical to the windings of the first.

6. A plurality of transfluxors substantially as claimed in claim 3, in which said transfluxors are arranged in the form of a matrix, and there are arranged as many groups of transfluxor as there are lines or circuits to be scanned.

7. Supervisory circuits as claimed in claim 1, in which the gating means includes:

an AND gate, means coupling the third winding to the AND gate, and means coupling the fourth winding to the AND gate, whereby the AND gate responds to coincidence between second cyclic pulses and an output from said fourth winding to produce a signal indicating a change in status of said fourth winding and thereby a change in utilization status of the respective telephone line.

References Cited

UNITED STATES PATENTS

| | | | |
|---|---|---|---|
| 3,048,828 | 8/1962 | Cataldo | 340—174 |
| 3,206,735 | 9/1965 | Lee | 340—174 |
| 3,275,999 | 9/1966 | Dick | 340—174 |
| 3,329,829 | 7/1967 | Grimm et al. | 340—174 |
| 3,343,146 | 9/1967 | Walker | 340—174 |

BERNARD KONICK, Primary Examiner

B. L. HALEY, Assistant Examiner

U.S. Cl. X.R.

179—18